(12) United States Patent
Fang et al.

(10) Patent No.: US 9,774,033 B2
(45) Date of Patent: **\*Sep. 26, 2017**

(54) PROCESS FOR PRODUCING SILICON NANOWIRES DIRECTLY FROM SILICON PARTICLES

(71) Applicant: Nanotek Instruments, Inc., Dayton, OH (US)

(72) Inventors: Qing Fang, Marysville, OH (US); Aruna Zhamu, Springboro, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 311 days.

This patent is subject to a terminal disclaimer.

(21) Appl. No.: 14/545,106

(22) Filed: Mar. 27, 2015

(65) Prior Publication Data

US 2016/0285083 A1    Sep. 29, 2016

(51) Int. Cl.

| C01B 3/00 | (2006.01) |
|---|---|
| H01M 4/36 | (2006.01) |
| C01B 33/021 | (2006.01) |
| C01B 33/02 | (2006.01) |
| H01M 4/134 | (2010.01) |
| H01M 4/1395 | (2010.01) |
| H01M 4/62 | (2006.01) |
| H01M 4/02 | (2006.01) |

(52) U.S. Cl.
CPC ............. *H01M 4/366* (2013.01); *C01B 33/02* (2013.01); *C01B 33/021* (2013.01); *H01M 4/134* (2013.01); *H01M 4/1395* (2013.01); *H01M 4/625* (2013.01); *C01P 2004/03* (2013.01); *C01P 2004/16* (2013.01); *H01M 2004/027* (2013.01)

(58) Field of Classification Search
CPC .................................................. C01B 33/021
See application file for complete search history.

(56) References Cited

U.S. PATENT DOCUMENTS

| 7,615,206 | B2 | 11/2009 | Sandhage et al. | |
| 9,601,763 | B2* | 3/2017 | Fang | H01M 4/366 |
| 2006/0019472 | A1* | 1/2006 | Pan | B82Y 10/00 |
| | | | | 438/486 |
| 2011/0309306 | A1* | 12/2011 | Zhou | B82Y 40/00 |
| | | | | 252/500 |

\* cited by examiner

*Primary Examiner* — Robert Vetere

(57) ABSTRACT

Disclosed is a process for producing silicon nanowires having a diameter or thickness less than 100 nm, comprising: (A) preparing a solid silicon source material in a particulate form having a size from 0.2 μm to 20 μm or in a porous structure form having a specific surface area greater than 50 m²/g; (B) depositing a catalytic metal, in the form of nano particles having a size from 0.5 nm to 100 nm or a coating having a thickness from 1 nm to 100 nm, onto surfaces of the silicon source material to form a catalyst metal-coated silicon material; and (C) exposing the catalyst metal-coated silicon material to a high temperature environment, from 300° C. to 2,000° C., for a period of time sufficient to enable a catalytic metal-catalyzed growth of multiple silicon nanowires from the silicon source material.

18 Claims, 6 Drawing Sheets

US 9,774,033 B2

PROCESS FOR PRODUCING SILICON NANOWIRES DIRECTLY FROM SILICON PARTICLES

FIELD OF THE INVENTION

This invention relates to a process for producing silicon nanowires for lithium-ion battery anode applications.

BACKGROUND

Lithium ion battery is a prime candidate energy storage device for electric vehicle (EV), renewable energy storage, and smart grid applications. Graphite materials have been widely used as an anode active material for commercial lithium ion batteries due to their relatively low cost and excellent reversibility. However, the theoretical lithium storage capacity of graphite is only 372 mAh/g (based on $LiC_6$), which can limit the total capacity and energy density of a battery cell. The emerging EV and renewable energy industries demand the availability of rechargeable batteries with a significantly higher energy density and power density than what the current Li ion battery technology can provide. Hence, this requirement has triggered considerable research efforts on the development of electrode materials with higher specific capacity, excellent rate capability, and good cycle stability for lithium ion batteries.

Several elements from Group III, IV, and V in the periodic table can form alloys with Li at certain desired voltages. Therefore, various anode materials based on such elements and some metal oxides (e.g., $SnO_2$) have been proposed for lithium ion batteries. Among these, silicon is considered the most promising one since it has the highest theoretical specific capacity (up to 4,200 mAh/g in the stoichiometric form of $Li_{4.4}Si$) and low discharge potential (i.e., high operation potential when paired with a cathode).

However, the dramatic volume changes (up to 380%) of Si during lithium ion alloying and de-alloying (cell charge and discharge) often led to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsic low electric conductivity of silicon is another challenge that needs to be addressed. Thus far, many attempts have been made to improve the electrochemical performance of Si-based anode materials, which include (1) reducing particle size to the nano-scale (<100 nm), such as Si nanoparticles, nanowires, or thin film, to reduce the total strain energy, which is a driving force for crack formation in the particle; (2) depositing Si particles on a highly electron-conducting substrate; (3) dispersing Si particles in an active or non-active matrix; and (4) coating Si particles with a layer of carbon. Although some promising anodes with specific capacities in excess of 1,000 mAh/g (at a low charge/discharge rate; e.g. 0.1 C) have been reported, it remains challenging to retain such high capacities over cycling (e.g., for more than 100 cycles) without significant capacity fading. Furthermore, at a higher C rate, Si particles are typically incapable of maintaining a high lithium storage capacity. It may be noted that a rate of n C means completing the charge or discharge cycle in 1/n hours: 0.1 C=10 hours, 0.5 C=2 hours, 3C=⅓ hours or 20 minutes.

Although nano-scaled Si materials, such as Si nanoparticles, Si nanowires, and Si nano films, are promising high-capacity anode materials, these materials remain too expensive to be economically viable. Common methods used for producing silicon nano powders include plasma-enhanced chemical vapor deposition (PECVD), laser-induced pyrolysis of $SiH_4$, and hot-wire synthesis methods. From mass production and cost perspectives, current processes for producing nano Si powder have been time-consuming and energy-intensive, also typically requiring the use of high-vacuum, high-temperature, and/or high-pressure production equipment. The resulting Si nano powder products have been extremely expensive and this cost issue has severely impeded the full-scale commercialization of Si nano powder materials. Hence, there exists a strong need for a more cost-effective process for producing Si nano powder (e.g. Si nanowires or nano particles) in large quantities.

For instance, U.S. Pat. No. 7,615,206 issued on Nov. 10, 2009 to K. H. Sandhage and Z. H. Bao provides methods for the production of shaped nanoscale-to-microscale silicon through partially or completely converting a nanoscale-to-microscale silica template by using magnesium vapor. Magnesiothermic reduction of silica requires much lower temperatures (normally in the range of 600-800° C.) compared with the carbothermal reduction of silica (normally over 2000° C.) and thus has become a relatively popular technique used in pure metal production. Silicon is obtained by the following reaction: $2Mg+SiO_2 \rightarrow 2MgO+Si$. However, this process must be conducted under a high pressure condition and there is the danger of explosion not just during the reaction procedure (due to pressure vessel weakness), but also after the reaction is presumably completed when the reactor is opened (ultra-fast reaction of un-used Mg with air). Furthermore, when using Mg vapor to chemically reduce silica, magnesium silicide could be easily formed and, hence, this process is not suitable for mass production. Using magnesium powder will add to cost of producing nano-sized silicon and the particle size of magnesium could dramatically influence the reduction results and purity.

Herein, we present a facile and cost-effective method of mass-producing silicon nanowires. This method avoids all the problems commonly associated with conventional methods of producing nano-scaled Si.

SUMMARY OF THE INVENTION

The present invention provides a process for producing silicon nanowires, having a diameter or thickness less than 100 nm, directly from a small Si particle or a porous Si structure. The process includes: (A) preparing a solid silicon source material in a particulate solid form having a size from 0.2 μm to 20 μm, or in a porous structure form having pore sizes from 2 nm to 10 μm and a specific surface area greater than 20 m²/g (preferably >50 m²/g, more preferably 100 m²/g, further preferably >200 m²/g, and most preferably >500 m²/g), wherein the solid silicon source material contains neat Si element (having at least 99.9% by weight of Si) or a Si alloy or mixture (having from 70% to 99.9% by weight of Si therein); (B) depositing a catalytic metal, in the form of nano particles having a size from 0.5 nm to 100 nm (preferably <20 nm, further preferably <10 nm) or a coating having a thickness from 1 nm to 100 nm (preferably <20 nm, further preferably <10 nm), onto surfaces of the silicon source material to form a catalyst metal-coated silicon material; and (C) exposing said catalyst metal-coated silicon material to a high temperature environment, from 300° C. to 2,500° C., for a period of time sufficient to enable a catalytic metal-catalyzed growth of multiple silicon nanowires from the silicon source material.

The step (C) of exposing the catalyst metal-coated mixture mass to a high temperature environment is preferably conducted in steps, including at least at a lower temperature (first temperature) for a first period of time and then at a higher temperature (second temperature) for a second period of time. These temperatures can include a first temperature from 300° C. to 1,000° C. and a second temperature from 600° C. to 2,500° C. The heat treatment at the first temperature is mainly aimed at reducing the metal precursor (e.g. a metal salt) to a metal phase or to activate the metal coated on Si source material. The heat treatment at the second temperature is aimed at building a thermodynamic environment conducive to initiation and growth of Si nanowires from the solid Si source material. It may be noted that the required high temperature range depends on the catalytic metal used. For instance, for Cu, Ni, and/or Fe, the range is preferably from 700° C. to 1,000° C. For catalysts containing noble metals, the reaction temperatures are preferably higher.

These Si nanowires appear to have extruded out from the starting Si particles and emanate from a center of the solid Si source material. The silicon nanowires produced in this manner typically have a diameter less than 100 nm and a length-to-diameter aspect ratio of at least 5 (more typically l/d =10-10,000 and most typically 100-1,000).

In an embodiment, the silicon source material contains silicon particles having a diameter from 0.5 μm to 10 μm, preferably from 0.5 μm to 5 μm, and most preferably less than 3 μm. We have unexpectedly observed that (a) Si particles larger than 5 μm tend to have residual Si particles that are left behind after Si nanowires have completed their growth; (b) Si particles smaller than approximately 3 μm tend to have no residual Si particles that are left behind after Si nanowires have completed their growth; and (c) Si particles larger than 3 μm but smaller than 5 μm tend to have small residual Si particles (having a diameter less than 200 nm) that are left behind after Si nanowires have completed their growth. A Si nano particle smaller than 200 nm for use as an anode active material might be acceptable to lithium battery industry since Si particles smaller than 200 nm (particularly those smaller than 100 nm) exhibit significantly reduced pulverization problem upon repeated battery charges/discharges as compared to those Si particles larger than 200 nm or in the micron scale.

In another embodiment, the silicon source material contains a porous structure having a specific surface area greater than 100 m$^2$/g, preferably greater than 200 m$^2$/g, and more preferably greater than 500 m$^2$/g. After an extensive and in-depth study, we have surprisingly observed that a larger specific surface area of the porous Si structure leads to a larger number of Si nanowires and the resulting Si nanowires have a smaller diameter. In an embodiment, the porous structure contains a thin film or coating having a thickness less than 5 μm, preferably less than 1 μm.

In an embodiment, the Si alloy or mixture (the Si source material) contains a metal element selected from Li, K, Na, Cu, Ni, Co, Mn, Fe, Ti, Al, Ag, Au, Pt, Pd, or a combination thereof. Not only pure Si but also Si-metal alloy can be a good source of Si nanowires. The non-Si metal content in the Si source material is preferably <30% by wt. metal, more preferably <20%, and most preferably <10%. The most desirable metal elements are those that can form a eutectic or eutectoid point with Si in a Si-metal phase diagram.

In an embodiment, the step of depositing a catalytic metal on surfaces of the Si source material includes (a) dissolving or dispersing a catalytic metal precursor in a liquid to form a precursor solution, (b) bringing said precursor solution in contact with surfaces of said silicon source material, (c) removing said liquid; and (d) chemically or thermally converting said catalytic metal precursor to said catalytic metal coating or nano particles. The step (d) of chemically or thermally converting the catalytic metal precursor is conducted concurrently with the procedure (C) of exposing the catalyst metal-coated material to a high temperature environment.

Preferably, the catalytic metal precursor is a salt or organo-metal molecule of a transition metal selected from Cu, Ni, Co, Mn, Fe, Ti, Al, or a combination thereof. Examples of the precursors include copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

The catalytic metal is preferably selected from Cu, Ni, Co, Mn, Fe, Ti, Al, Ag, Au, Pt, Pd, or a combination thereof. They can be produced from the aforementioned precursors. Alternatively, the deposition of catalytic metal can be accomplished more directly. Thus, in an embodiment, the step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof.

The procedure of exposing the catalyst metal-coated silicon source material to a high temperature environment may be conducted in a protective atmosphere of an inert gas, nitrogen gas, hydrogen gas, a mixture thereof, or in a vacuum.

The presently invented process may further comprise a procedure of removing the catalytic metal from said silicon nanowires after the nanowires are produced; for instance, via chemical etching or electrochemical etching.

The process may further comprise a procedure of mixing silicon nanowires with a carbonaceous or graphitic material (as a conductive additive) and an optional binder material to form an electrode layer, wherein the carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

The present invention also provides a battery electrode containing silicon nanowires that are produced by the inventive process. Also provided is a lithium battery containing silicon nanowires produced by the inventive process as an anode active material.

DETAILED DESCRIPTION OF PREFERRED EMBODIMENTS

The present invention provides a process for initiating and growing Si nanowires from micron or sub-micron scaled silicon particles having an original particle diameter (prior to nanowire growth) from 0.2 µm to 20 µm. In other words, the starting material is micron or sub-micron scaled silicon particles, which are thermally and catalytically converted directly into nano-scaled, wire-shaped Si having a diameter or thickness less than 100 nm.

Figure 2:
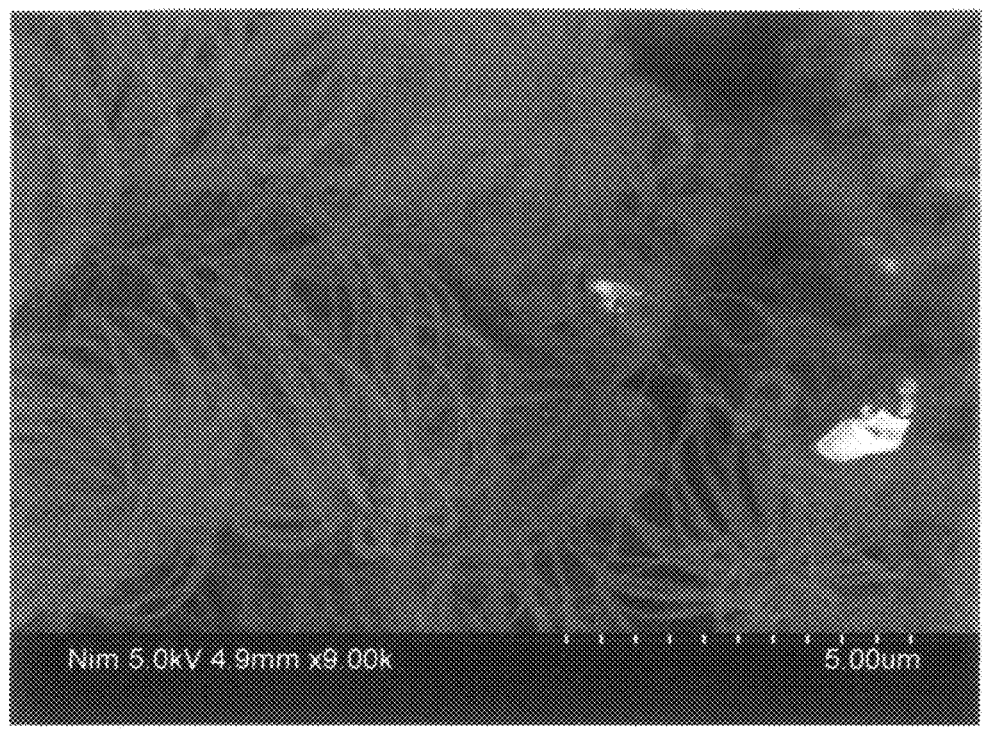
FIG. 2 SEM image of Si nanowires that are grown (emanated) from small Si micron particles.
Figure 3:
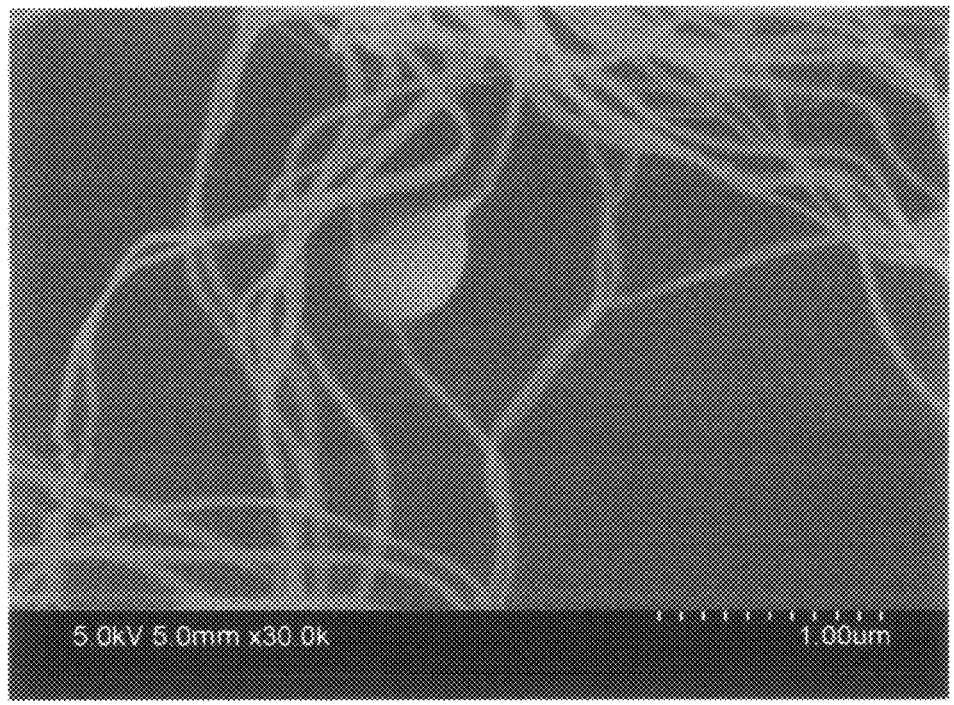
FIG. 3 SEM image of Si micron particles having an original diameter greater than 5 µm.

Studies using scanning electron microscopy (SEM) indicate that tens of nanowires can be grown or "extruded out" from a starting solid Si particle. As an example, FIG. 2 shows that tens of Si nanowires have been sprouted or emanated from each Si particle that was originally 2.3 µm in diameter. These Si nanowires have drawn the needed Si atoms from the few starting Si particles. By spitting out such a large number of nanowires, the original Si particles were fully expended. When larger particles having an original diameter >5 µm were used, there were typically some residual Si particles left (e.g. FIG. 3).

There are several advantages associated with this process. For instance, there is no chemical reaction (such as converting $SiH_4$ into Si in a CVD process) and the process does not involve any undesirable chemical, such as silane, which is toxic. There is no danger of explosion, unlike the process of converting $SiO_2$ to Si using magnesium vapor. Other additional advantages will become more apparent later.

Figure 1A:
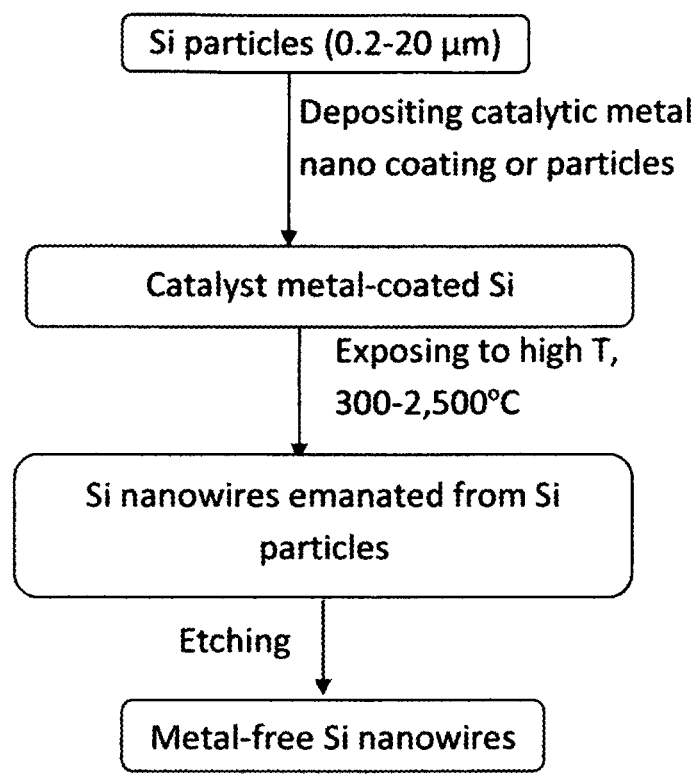
FIG. 1(A) A flow chart showing a preferred route to preparing Si nanowires from Si particles, having a diameter from 0.2 µm to 20 µm; (B) A flow chart showing a preferred route to preparing Si nanowires from a porous Si structure (particles or films that have a specific surface area >20 m²/g, preferably >50 m²/g).
Figure 1B:
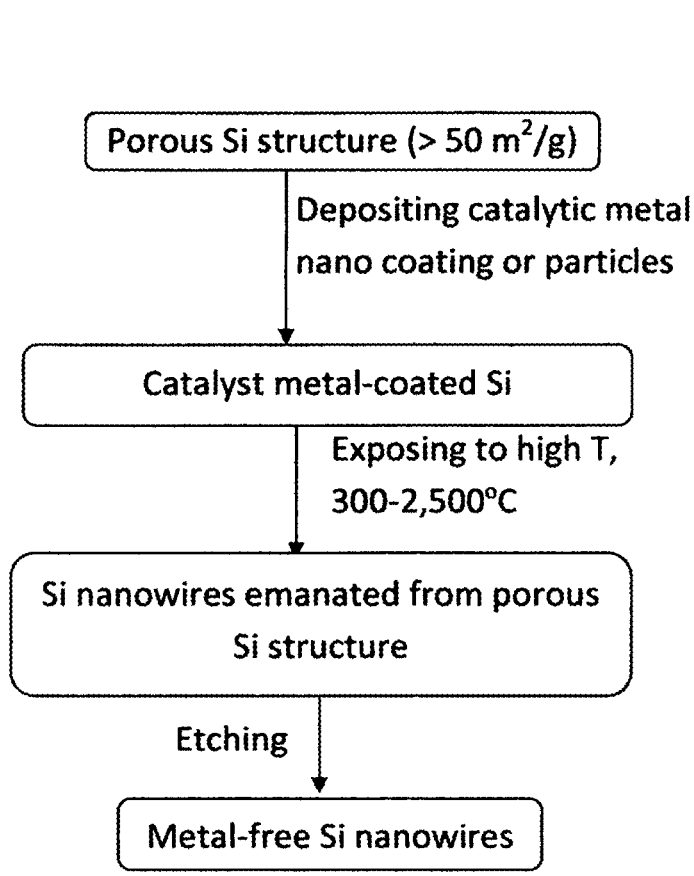

As illustrated in FIGS. 1(A) and 1(B), this process begins by preparing a catalyst metal-coated Si particles or metal-coated porous Si structures, respectively. This is accomplished by carrying out the following procedures: (A) preparing a silicon source material in a particulate form having a size from 0.2 µm to 20 µm, or in a porous structure form having pore sizes from 2 nm to 10 µm and a specific surface area greater than 50 m²/g, wherein the silicon source material contains neat Si element (having at least 99.9% by weight of Si) or a Si alloy or mixture (having from 70% to 99.9% by weight of Si therein); and (B) depositing a catalytic metal, in the form of nano particles having a size from 0.5 nm to 100 nm or a coating having a thickness from 1 nm to 100 nm, onto surfaces of the silicon source material to form a catalyst metal-coated silicon material. This is then followed by step (C) of exposing the catalyst metal-coated silicon material to a high temperature environment, from 300° C. to 2,500° C., for a period of time sufficient to enable a catalytic metal-catalyzed growth of multiple silicon nanowires from the silicon source material. These Si nanowires are emanated or extruded out from the silicon particles, which act as the source material for the growing Si nanowires to feed on.

It may be noted that this high temperature range depends on the catalytic metal used. For instance, for Cu, Ni, and/or Fe, the range is preferably from 700° C. to 1,000° C. For catalysts containing noble metals, the reaction temperatures are much higher, more typically from 1,000° C. to 2,000° C.

The starting silicon particles preferably have a diameter from 0.5 µm to 5 µm, more preferably <3 µm. The starting Si particles are preferably spherical in shape, but can be of any shape. Si particles of various shapes and various particle sizes are commercially available.

The solid Si source material can be in a porous structure form. Commonly used methods to produce porous silicon structures (porous plates, discs, particles, fibers, and films, etc.) include stain etching, anodization, etc. A possible anodization cell for use in introducing pores in silicon employs platinum cathode and silicon wafer anode immersed in hydrogen fluoride (HF) electrolyte. Corrosion of the anode is produced by running electrical current through the cell. The running of constant direct current (DC) is usually implemented to ensure steady tip-concentration of HF, resulting in a more homogeneous porosity layer although pulsed current is more appropriate for the formation of thick silicon wafers bigger than 50 µm. When purely aqueous HF solutions are used for the porous silicon formation, the hydrogen bubbles stick to the surface and induce lateral and in-depth inhomogeneity. The hydrogen evolution is normally treated with absolute ethanol in concentration exceeding 15%. The introduction of ethanol can eliminate hydrogen and ensure complete infiltration of HF solution within the pores, leading to more uniform distribution of porosity and thicknesses.

Porous silicon can also be produced through stain-etching with hydrofluoric acid, nitric acid, and water. It is well-known that stain films can be grown in dilute solutions of nitric acid in concentrated hydrofluoric acid. This method is advantageous because of its simplicity and the corrosive reagents (i.e. nitric acid ($HNO_3$) and hydrogen fluoride (HF)) being readily available. Stain-etching is particularly useful for producing a thin film of porous Si. Porous silicon can be synthesized chemically from silicon tetrachloride, using self-forming salt byproducts as templates for pore formation. The salt templates are later removed with water.

In an embodiment, the step of depositing a catalytic metal includes:
(a) dissolving or dispersing a catalytic metal precursor in a liquid to form a precursor solution; e.g. dissolving nickel nitrate, $Ni(NO_3)_2$, in water;
(b) bringing the precursor solution in contact with surfaces of silicon particles; e.g. immersing the Si particles into the $Ni(NO_3)_2$-water solution;
(c) removing the liquid component; e.g. vaporizing water of the $Ni(NO_3)_2$-water solution, allowing $Ni(NO_3)_2$ to coat on the surfaces of Si particles; and
(d) chemically or thermally converting the catalytic metal precursor (e.g. $Ni(NO_3)_2$) to the catalytic metal coating or metal nano particles; e.g. by heating the $Ni(NO_3)_2$-coated mass at 450-650° C. in a reducing environment (e.g. in a flowing gas mixture of hydrogen and argon).

In one embodiment, the step (d) of chemically or thermally converting the catalytic metal precursor is conducted concurrently with the step of exposing the catalyst metal-coated Si particles and/or porous Si structures to a high temperature environment.

The catalytic metal precursor may be a salt or organo-metal molecule of a transition metal selected from Cu, Ni, Co, Mn, Fe, Ti, Al, or a combination thereof. Preferably, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper carboxylate, nickel carboxylate, cobalt carboxylate, manganese carboxylate, iron carboxylate, titanium carboxylate, aluminum carboxylate, or a combination thereof. Different types of precursor require different temperatures and/or chemical reactants for conversion to the catalytic metal phase. Different catalytic metals enable Si nanowire growth at different temperatures.

In a preferred embodiment, the catalytic metal is selected from Cu, Ni, Co, Mn, Fe, Ti, Al, Ag, Au, Pt, Pd, or a combination thereof. The step of depositing a catalytic metal may also be conducted by a procedure of physical vapor deposition (PVD), chemical vapor deposition (CVD), sputtering, plasma deposition, laser ablation, plasma spraying, ultrasonic spraying, printing, electrochemical deposition, electrode plating, electrodeless plating, chemical plating, or a combination thereof.

The procedure of exposing the catalyst metal-coated Si mass to a high temperature environment is preferably conducted in a protective or reducing atmosphere of an inert gas, nitrogen gas, hydrogen gas, a mixture thereof, or in a vacuum.

The Si nanowires grown from Si particles exhibit a diameter of typically >20 nm (more typically >30 nm and most typically >50 nm). In contrast and quite unexpectedly, the Si nanowires grown from porous Si structures are significantly thinner or smaller in diameter (typically from 2 nm to 20 nm). The diameter or thickness of the resulting Si nanowires is typically smaller and there is a larger number of Si nanowires obtained when/if the specific surface area of the porous Si structure is larger. These are highly desirable attributes since we have found that smaller Si nanowire diameters imply shorter diffusion paths for lithium ions and, hence, faster charge and discharge procedures for the lithium-ion batteries.

In one embodiment, the process may further comprise a procedure of removing the residual catalytic metal from the silicon nanowires; for instance, via chemical etching or electrochemical etching.

In a desired embodiment, the process of producing silicon nanowires is followed by a procedure of incorporating a carbonaceous or graphitic material into the mass of multiple silicon nanowires as a conductive additive in the preparation of an anode electrode. This carbonaceous or graphitic material may be selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

For instance, multiple Si nanowires may be readily packed into a porous membrane or mat (with or without a small amount of resin binder), which may be impregnated or infiltrated with carbon under a chemical vapor deposition (CVD) or chemical vapor infiltration condition. This may be accomplished by introducing methane or ethylene gas into the system at a temperature of 500-1,500° C. Alternatively, one may impregnate the porous silicon nanowire membrane with a resin or pitch, which is then heated to carbonize the resin or pitch at a temperature of 350-1,500° C. Alternatively, one may simply blend silicon nanowires with particles of a carbon or graphite material with an optional binder resin to form a multi-component mixture.

The following examples are provided for the purpose of illustrating the best mode of practicing the present invention and should not be construed as limiting the scope of the instant invention.

EXAMPLE 1

Preparation of Porous Si Particles and Metal-Coated Porous Si Particles

Commercially available SiO micro-particles were heated to 950° C. for 5 h under Ar atmosphere. During the heating process, phase separation in SiO occurs to form interconnected Si particles embedded in a $SiO_2$ matrix due to the thermal disproportionation of SiO according to the following reaction: $2SiO \rightarrow Si+SiO_2$. After selectively removing the $SiO_2$ matrix with HF solution, the resulting structure becomes a highly porous Si particle.

These porous Si particles were then dispersed in a 50:50 water-alcohol solution containing a polyethylene oxide resin binder (0.1% by weight of PEO) to form a slurry. The porous Si particle slurry was then filtered through a vacuum-assisted membrane filtration apparatus to obtain porous layers (membranes) of porous Si particle paper or mat. For comparison, non-porous Si particles (4.5 µm in diameter) were also made into a paper form.

These mat/paper membranes (composed of porous or non-porous Si particles) were then impregnated with a solution of nickel nitrate, iron nitrate, and copper acetate in water. Water was subsequently removed from the impregnated membranes and the dried membranes were then exposed to a heat treatment in a reducing atmosphere of $H_2$ and Ar gas according to a desired temperature profile. This profile includes typically from room temperature to a reduction temperature of approximately 300-700° C. (for reduction of nickel nitrate to Ni nano coating, for instance). The temperature was continued to rise to a final temperature of 700-1,200° C. and the system was allowed to cool down naturally. Si nanowires were found to emanate from existing porous and non-porous Si particles in separate samples. The Si nanowires grown from non-porous Si particles were found to have diameters in the approximate range of 30-80 nm, but those from porous Si particles in the range of 10-30 nm.

EXAMPLE 2

Preparation of Si Nanowires From Porous and Non-Porous Si Discs

Porous silicon (P-Si) etching was performed in a home-made electrochemical cell using a spiral Pt counter electrode. Highly boron-doped (0.01-0.02 Ωcm) silicon wafers were utilized in an etch process of duration 180 seconds with a current density of 45 mA/cm$^2$ in a 3:8 v/v HF (50% $H_2O$ by volume) and ethanol solution. The etch condition yielded ~75% porosity P-Si films confirmed by optical reflectivity measurements. Following the P-Si etch process, the samples were washed in ethanol and stored in a $N_2$ glove box until the step of Ni and Au sputtering. For comparison, same boron-doped silicon wafers were also deposited with Ni and Au.

The metal-coated discs were then subjected to heat treatments that involve placing the discs in a tube furnace at a temperature of 900° C. (Ni-coated) and 1,500° C. (Au/Ni-coated), respectively, in Ar gas atmosphere. Catalytic growth of Si nanowires from Si discs occurred during the subsequent cooling process. The diameter of Si nanowires produced from non-porous discs is in the range of 45 nm to 92 nm, but the diameter of those from porous Si discs is from 15 nm to 37 nm.

EXAMPLE 3

Preparation of Si Nanowires From Si Particles of Various Diameters

Si particles of 3 μm-20 μm in diameter are commercially available. Particles of 3 μm in diameter were then wet-milled to 0.45 μm and 0.76 μm in two separate samples.

A desired amount of cobalt sulfate and, separately, iron sulfate, was dissolved in water to form two separate metal salt solutions. Each metal salt solution was then added into a Si particle-water suspension to form a slurry sample. The slurries were then cast onto a glass surface using a doctor's blade to regulate the film thickness. The resulting Si/metal salt films, after removal of liquid, have a thickness that can be varied from approximately 10 to 100 μm. The resulting Si/metal salt compact was then subjected to heat treatments that typically involve an initial thermal reduction temperature of 300-800° C. for 1-5 hours, followed by heat-treating at a second temperature of 800-1,500° C. Again, these heat treatments accomplish reduction of metal salt to metal nano coating (2 nm-11 nm) and catalytic growth of Si nanowires from Si particles.

Figure 4:
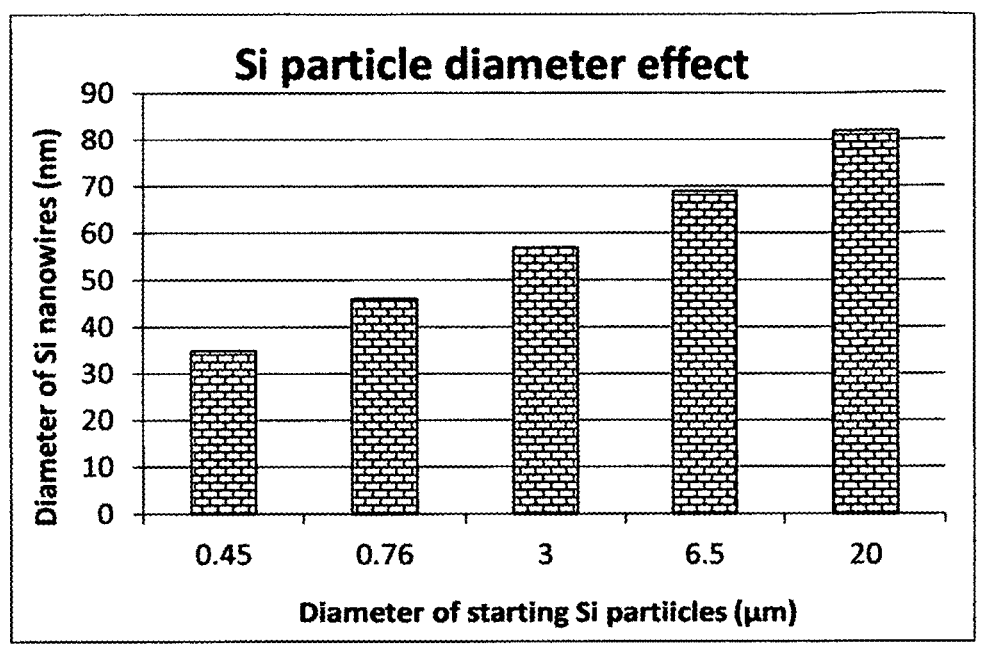
FIG. 4 The effect of original Si particle size on the diameter (thickness) of the Si nanowires grown from these Si particles.

Summarized in FIG. 4 is the effect of original Si particle size on the diameter or thickness of the Si nanowires grown from these Co-coated Si particles. Surprisingly, a smaller Si particle leads to a larger number of smaller-diameter Si nanowires. The Si nanowires produced from Co-coated Si particles are thinner than those produced from Fe-coated Si particles.

EXAMPLE 4

Preparation of Si Particles of Various Alloy Compositions

Several examples of Si alloys or mixtures were studied for evaluating their suitability of growing Si nanowires: Si—Li (0-20% by weight), Si—Al (0-3%), Si—B (0-0.5%), and Si—Fe (0-10%). Catalytic metal thickness effects were also investigated.

By using SEM to examine starting Si particles as well as the resulting Si nanowires, we made some important discoveries, summarized below:

(A) A higher alloying element amount does not make it easier or more difficult to form Si nanowires of desired diameters; however, the required final heat treatment temperature tends to increase with increasing contents of Al, B, and Fe. A larger amount of Li leads to a lower temperature, however.

(B) Again, porous Si and smaller-diameter Si particles lead to a larger number of Si nanowires and these Si nanowires are smaller in diameter.

(C) The number of Si nanowires that can be emanated from a metal-coated Si particle per unit weight of catalytic metal deposited increases with decreasing catalytic metal coating thickness. Such a trend is applicable to all Si alloy compositions.

Figure 5:
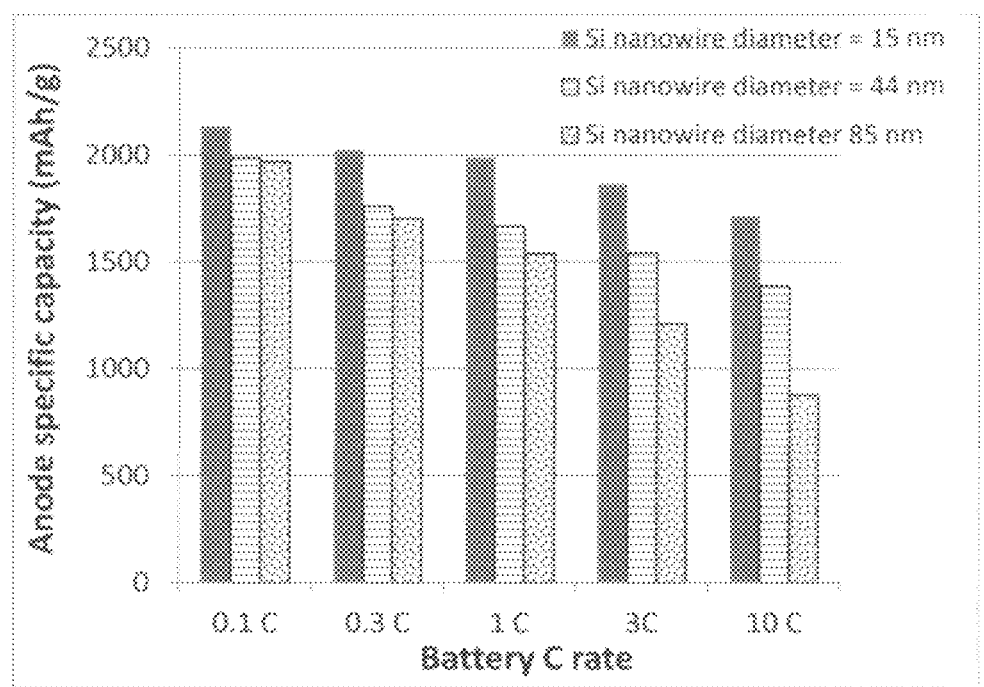
FIG. 5 Specific capacity values of three anodes containing Si nanowires of different diameters, all plotted as a function of the discharge C rates (nC=completing a cycle in 1/n hour; 3C=⅓ hours or 20 minutes).

(D) We have further observed that a larger number of smaller-diameter Si nanowires, given the same Si amount, enables a battery anode active material featuring the presently invented Si nanowires to deliver a higher specific capacity at a higher current density (i.e. a higher C rate). For instance, FIG. 5 shows the specific capacity values of three anodes containing Si nanowires of different diameters, plotted as a function of the discharge C rates (nC=completing a cycle in 1/n hour; 3C=⅓ hours or 20 minutes). The Si nanowires having an ultrathin diameter (15 nm) are capable of delivering a significantly higher capacity than those having a diameter of 44 nm and 85 nm.

(E) The present invention enables the cost-effective production of thin Si nanowires that are highly effective high-capacity anode active materials. The processes are fast, energy-efficient, and very inexpensive.

EXAMPLE 5

Lithium-Ion Batteries Featuring Si Nanowires as an Anode Active Material

For electrochemical testing, several types of anodes and cathodes were prepared. For instance, a layer-type of anode was prepared by simply coating slurry of Si nanowires, conductive additives, and a binder resin to form an anode layer against a sheet of Cu foil (as an anode current collector).

For instance, the working electrodes were prepared by mixing 65 wt. % active material (Si nanowires), 27 wt. % acetylene black (Super-P, as a conductive additive), and 8 wt. % polyvinylidene fluoride (PVDF) as a binder dissolved in N-methyl-2-pyrrolidinoe (NMP). After coating the slurries on Cu foil, the electrodes were dried at 120° C. in vacuum for 2 h to remove the solvent before a compression treatment.

Then, the electrodes were cut into a disk (φ=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). Various anode material compositions were evaluated. The cell assembly was performed in an argon-filled glovebox. The CV measurements were carried out using a CH-6 electrochemical workstation at a scanning rate of 1 mV/s. The electrochemical performance of Si nanowires was also evaluated by galvanostatic charge/discharge cycling at a current density of 50-1,000 mA/g, using a LAND electrochemical workstation. Full-cell pouch configurations using lithium iron phosphate and lithium cobalt oxide cathodes were also prepared and tested.

Some experimental results are summarized in FIG. 5, which indicates that the composite anode containing 65% by wt. of Si nanowires having a diameter of 15 nm is capable of delivering a lithium storage capacity of 2,134 mAh/g (based on the total electrode composite weight, not just the Si weight) at 0.1 C rate and 1,715 mAh/g at 10 C rate. At this ultra-high rate of 10 C, one can complete the charge or discharge in 1/10 hours or 6 minutes. This is a tremendous accomplishment. Imagine you can totally recharge your smart phone in 6 minutes.

As of now, it typically takes 2 hours. As a point of reference, natural graphite, the most commonly used anode active material, is capable of storing lithium up to 370 mAh/g at 0.1 C rate, but only 250 mAh/g at 10 C rate.

We claim:

1. A process for producing silicon nanowires having a diameter or thickness less than 100 nm, said process comprising:
   (A) preparing a solid silicon source material in a particulate solid form having a size from 0.2 pm to 20 μm or in a porous solid structure form having pore sizes from 2 nm to 10 μm and a specific surface area greater than 20 m$^2$/g, wherein said silicon source material contains neat Si element having at least 99.9% by weight of Si or a Si alloy or mixture having from 70% to 99.9% by weight of Si therein;
   (B) depositing a catalytic metal, in the form of nano particles having a size from 0.5 nm to 20 nm or a coating having a thickness from 1 mil to 20 nm, onto surfaces of said solid silicon source material to form a catalyst metal-coated silicon material; and
   (C) exposing said catalyst metal-coated silicon material to a high temperature environment, from 300° C. to 2,500° C., for a period of time sufficient to enable a catalytic metal-catalyzed growth of multiple silicon nanowires from said silicon source material.

2. The process of claim 1, wherein said solid silicon source material contains silicon particles having a diameter from 0.5 μm to 10 μm.

3. The process of claim 1, wherein said solid silicon source material contains silicon particles having a diameter from 0.5 pm to 5 μm.

4. The process of claim 1, wherein said solid silicon source material contains a porous structure having a specific surface area greater than 100 m$^2$/g.

5. The process of claim 1, wherein said solid silicon source material contains a porous structure having a specific surface area greater than 200 m$^2$/g.

6. The process of claim 1, wherein said solid silicon source material contains a porous structure having a specific surface area greater than 500 m$^2$/g.

7. The process of claim 1, wherein said Si alloy or mixture contains a metal element selected from Li, K, Na, Cu, Ni, Co, Mn, Fe, Ti, Al, Ag, Au, Pt, Pd, or a combination thereof.

8. The process of claim 1, wherein said porous structure contains a thin film or coating having a thickness less than 5 μm.

9. The process of claim 1, wherein said porous structure contains a thin film or coating having a thickness less than 1 μm.

10. The process of claim 1, wherein said step of depositing a catalytic metal includes (a) dissolving or dispersing a catalytic metal precursor in a liquid to form a precursor solution, (b) bringing said precursor solution in contact with surfaces of said solid silicon source material, (c) removing said liquid; and (d) chemically or thermally converting said catalytic metal precursor to said catalytic metal coating or nano particles.

11. The process of claim 10, wherein said step (d) of chemically or thermally converting said catalytic metal precursor is conducted concurrently with the procedure (C) of exposing said catalyst metal-coated mixture mass to a high temperature environment.

12. The process of claim 10, wherein said catalytic metal precursor is a salt or organo-metal molecule of a transition metal selected from Cu, Ni, Co, Mn, Fe, Ti, Al, or a combination thereof.

13. The process of claim 10, wherein said catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

14. The process of claim 1, wherein said catalytic metal is selected from Cu, Ni, Co, Mn, Fe, Ti, Al, Ag, Au, Pt, Pd, or a combination thereof.

15. The process of claim 1, wherein said step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, or a combination thereof.

16. The process of claim 1, wherein said procedure of exposing said catalyst metal-coated silicon material to a high temperature environment is conducted in a protective atmosphere of an inert gas, nitrogen gas, hydrogen gas, a mixture thereof, or in a vacuum.

17. The process of claim 1, further comprising a procedure of removing said catalytic metal from said silicon nanowires.

18. The process of claim 1, further comprising a procedure of mixing silicon nanowires with a carbonaceous or graphitic material as a conductive additive and an optional binder material to form an electrode layer, wherein said carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, meso-phase carbon, meso-phase pitch, meso-carbon micro-bead, soft carbon, hard carbon, coke, carbon fiber, carbon nano-fiber, carbon nano-tube, carbon black, or a combination thereof.

* * * * *